(12) United States Patent
Janvikul et al.

(10) Patent No.: US 8,501,893 B2
(45) Date of Patent: Aug. 6, 2013

(54) SYNTHETIC METHOD FOR PREPARING DUAL CURABLE SILICONE COMPOSITIONS

(75) Inventors: Wanida Janvikul, Bangkok (TH); Boonlom Thavornyutikarn, Bangkok (TH); Paradorn Ngamdee, Nakhonsawan (TH)

(73) Assignee: National Science and Technology Development Agency, Pathumthani (TH)

( * ) Notice: Subject to any disclaimer, the term of this patent is extended or adjusted under 35 U.S.C. 154(b) by 499 days.

(21) Appl. No.: 12/359,012

(22) Filed: Jan. 23, 2009

(65) Prior Publication Data
US 2009/0192282 A1 Jul. 30, 2009

(30) Foreign Application Priority Data

Jan. 25, 2008 (TH) .................................. 0801000373
Jan. 25, 2008 (TH) .................................. 0801000374

(51) Int. Cl.
*C08G 77/08* (2006.01)
(52) U.S. Cl.
USPC .................... 528/15; 528/31; 528/26; 528/37
(58) Field of Classification Search
USPC .......................................... 528/15, 26, 37, 31
See application file for complete search history.

(56) References Cited

U.S. PATENT DOCUMENTS

| 2,793,223 | A | * | 5/1957 | Merker | 556/440 |
| 4,585,669 | A | * | 4/1986 | Eckberg | 427/515 |
| 6,548,568 | B1 | | 4/2003 | Pinto et al. | 522/99 |
| 7,009,024 | B2 | | 3/2006 | Salamone et al. | 528/43 |
| 2009/0276042 | A1 | * | 11/2009 | Hughes et al. | 623/6.56 |

FOREIGN PATENT DOCUMENTS

| WO | WO 03/002635 | 1/2003 |
| WO | WO 2007/050580 | 5/2007 |

OTHER PUBLICATIONS

Cazacu et al., "Synthesis of Functional Telechelic Polydimethylsiloxanes by Ion-Exchangers Catalysis", European Polymer Journal 35:1629-1635, 1999.
Kang et al., "Ionic Conductivity and Electrochemical Properties of Cross-Linked Solid Polymer Electrolyte Using Star-Shaped Siloxane Acrylate", Journal of Power Sources 165:92-96, 2007.
Ortiz et al., "Synthesis of Hybrid Methacrylate-Silicone-Cyclohexanepoxide Monomers and the Study of their UV Induced Polymerization", Progress in Organic Coatings 57:159-164, 2006.

* cited by examiner

*Primary Examiner* — Margaret Moore
(74) *Attorney, Agent, or Firm* — Fish & Richardson P.C.

(57) ABSTRACT

A synthetic method for preparing dual curable (e.g., thermal and light curable) silicone compositions is provided. The first step being a chemical modification of silanichydride bonds in cyclic siloxane monomer by the hydrosilylation reaction with acrylate-/methacrylate-containing allylic monomer. The second step being a ring-opening polymerization of the acrylate-/methacrylate-functionalized cyclic siloxane monomer with siloxane monomers using an oligosiloxane as a chain terminator.

14 Claims, No Drawings

SYNTHETIC METHOD FOR PREPARING DUAL CURABLE SILICONE COMPOSITIONS

CROSS-REFERENCE TO RELATED APPLICATIONS

Under 35 U.S.C. §119, this application claims the benefit of a foreign priority applications filed in Thailand, serial numbers 0801000373 and 0801000374, filed Jan. 25, 2008, both of which are herein incorporated in their entirety.

TECHNICAL FIELD

This disclosure relates to a synthetic method for preparing dual (e.g., thermal and light) curable silicone compositions, and dual curable silicone compositions.

BACKGROUND

Silicones or polyorganosiloxanes are materials which have suitable properties for applications in various fields such as biomedical materials, electronic devices, etc. This has led to research and development in silicones with a view to improving the properties and processes involved. Prior to use, the silicones typically undergo chemical crosslinking to improve their strength to a suitable level for applications. Either thermal or light curing is generally used, depending mainly on functional groups in silicone structure and applications. For example, silicone coated on electronic devices is typically subjected to light curing since thermal curing may damage the items, and silicone dental sealants is generally subjected to light curing. At present, the light curing is more widely used.

One well-known reaction for silicone curing is a hydrosilylation reaction, which is a reaction between a silanichydride (Si—H) bond in silicone molecule chain and a carbon-carbon double bond in polyorganosiloxanes using a platinum catalyst. In this method, heat is normally applied to accelerate the curing.

Polyorganosiloxanes having a functional group susceptible to free radical reaction, e.g., acrylate or methacrylate group, can undergo thermal and/or light curing, when thermal- and/or photo-initiators are used, respectively. Several synthetic methods of preparing acrylate-/methacrylate-functionalized polyorganosiloxanes/silicones are known. U.S. Pat. No. 6,548,568 discloses the hydrosilylation reaction of a silanichydride bond in polysiloxane chain with a carbon-carbon double bond in allyl glycidyl ether using a platinum catalyst. Polysiloxane in this reaction was prepared by ring-opening polymerization of octamethylcyclotetrasiloxane (D4) with bis-trimethylsilyl methyl-hydrogen polysiloxane (MD'50M) using hexamethyldisiloxane (D2) as a chain terminator. After the hydrosilylation reaction, the obtained product having epoxy function can further react with an acrylate monomer. The silicone in the final stage would have acrylate groups in the structure, which are used as UV light curing sites; and methyl groups at the polymer chain ends (using D2 as a chain terminator).

U.S. Pat. No. 7,009,024 discloses a preparation of aromatic-based siloxane macromonomers, which provide UV light curable silicones. The preparation of the siloxane macromonomers includes two steps—the first step is a synthesis of hydride functionalized cyclic siloxanes, e.g., by reaction between tetramethylcyclotetrasiloxane (D4H) and 1,3-bis(4-methacryloyloxybutyl)tetramethyldisiloxane (M2, methacrylate-capped disiloxane), giving a product having silanichydride bonds and methacrylate groups at the molecule chain ends; the second step is a hydrosilylation of silanichydride bonds in the prepared product from the first step with aromatic functionalized allyl compounds, yielding a silicone macromonomer with aromatic side chains. In the light curing of the macromonomer, methacrylate monomer is also added. The obtained product can be used for ophthalmic devices such as intraocular tens.

WO 03/002635 discloses a preparation method of acrylate groups at both polymer chain ends using a hydrosilylation reaction of polydimethylsiloxane, dihydride terminated, with carbon-carbon double bond in allyl epoxide, followed by an epoxide ring opening reaction of the obtained product with polyols. The resulting product is then reacted with unsaturated carboxylic acid, e.g., methacrylic acid, giving acrylate groups at both polymer chain ends in the final step.

A disadvantage of hydrosilylation reaction of silanichydride bonds in polysiloxane or siloxane macromonomer is that it is difficult to control the degree of substitution due to the high molecular weight (high viscosity) of the starting substance and a vigorous reaction condition: e.g., high temperature, prolonged reaction time, and a large amount of catalyst is required compared to hydrosilylation reaction of silicone monomer.

R. A. Ortiz et al. ("Synthesis of hybrid methacrylate-silicone-cyclohexanepoxide monomers and the study of their UV induced polymerization", *Progress in Organic Coatings*, 57, (2006), 159-164) discloses a preparation of hybrid silicone monomer having a methacrylate group and epoxy ring in the structure using a hydrosilylation reaction of linear silicone hydride monomer—started by a hydrosilylation reaction between a silanichydride bond in the monomer with carbon-carbon double bond in a methacrylate-containing reagent, e.g., allyl methacrylate. The prepared hybrid silicone monomer is thermal and light curable.

Y. Kang et al. ("Ionic Conductivity and Electrochemical Properties of Cross-linked Solid Polymer Electrolyte Using Star-shaped Siloxane Acrylate", *Journal of Power Sources*, 165, (2007), 92-96) discloses a synthesis of star-shaped siloxane acrylate by the hydrosilylation reaction of tetramethylcyclotetrasiloxane (D4H) with poly(ethylene glycol)monoallyl ether, giving hydroxy-containing siloxane monomer undergoing acryloylation in the next step. The final product is siloxane monomer having acrylate groups at the chain ends, which is employed as a crosslinker by thermal curing with a thermal initiator (benzoyl peroxide (BPO) was used).

A synthesis method of siloxanes with various functional groups at the chain ends is disclosed in M. Cazacu et al. ("Synthesis of Functional Telechelic Polydimethylsiloxane by Ion-exchangers Catalysis", *European Polymer Journal*, 35 (1999), 1629-1635) which discloses a preparation of telechelic siloxane oligomers with various functional groups, such as vinyl (—CH=CH$_2$), aminopropyl (—(CH$_2$)$_3$—NH$_2$), methacryloxymethyl (—CH$_2$—O—OC(CH$_3$)C=CH$_2$), or carboxypropyl (—(CH$_2$)$_3$—COOH) at the polymer chain ends, using a ring-opening polymerization of octamethylcyclotetrasiloxane in disiloxanes with various described functional groups at both molecule ends (as a chain terminator of synthesized siloxane oligomers) using an ion exchanger catalyst.

WO 07/050,580 discloses a preparation method of pressure sensitive adhesive compositions having acrylate/methacrylate at the polymer chain ends using chain terminators (to control molecular weight of prepared products) in a group of silanes, silazanes, disilazanes, and disiloxanes having acrylate/methacrylate at the molecular ends.

SUMMARY

This disclosure relates to a synthetic method for preparing dual (e.g., thermal and light) curable silicone compositions, and dual curable silicone compositions.

In one aspect of the disclosure, the synthetic method for preparing the dual curable (e.g., thermal and light curable) silicone compositions, intermediates, processes of preparing the same, and compositions containing the same, is provided. The synthetic method includes two steps—the first step is a hydrosilylation reaction of a hydride functionalized cyclic siloxane monomer with an acrylate-/methacrylate-containing allylic monomer to give an acrylate-/methacrylate-functionalized cyclic siloxane monomer.

The second step is a ring-opening polymerization of the acrylate-/methacrylate-functionalized cyclic siloxane monomer obtained from the first step with linear polysiloxane, and/or $C_{1-4}$ alkyl substituted cyclic siloxane monomer, and/or hydride functionalized cyclic siloxane monomer using an oligosiloxane as a chain terminator. The oligosiloxane having various functional groups at both chain ends where the functional group can be vinyl ($CH_2=CH-$), acrylate ($-OOCCH=CH_2$), methacrylate ($-OOC(CH_3)C=CH_2$), hydroxyl ($-OH$), hydride ($-H$), alkyl ($-R$), or alkoxyl ($-OR$). The functional group on both ends can either be the same or different.

The synthesis method in this disclosure can simply and precisely control the incorporation of acrylate/methacrylate groups in siloxane polymers better than the method with post-addition of acrylate/methacrylate groups. The prepared silicone compositions can be used widely because they can be thermal and light curable. Besides having acrylate/methacrylate groups in the polymer chains, the presence of other reactive functional groups at both polymer chain ends, which can be the same or different, also broadens the application of such silicones.

In another aspect of the disclosure is provided, a silicone composition that includes a silicone of Structure 1:

Structure 1
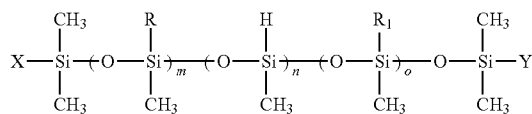

wherein R, at each occurrence, is $C_{1-4}$ alkyl group; $R_1$, at each occurrence, is a substituted group having an acrylate, methacrylate, or di(propylene glycol) methacrylate group; X and Y are independently vinyl, acrylate, methacrylate, hydroxyl, hydride, alkyl, or alkoxyl, wherein said alkyl is optionally substituted with vinyl, acrylate, methacrylate, or hydroxyl; and m, n, and o are independently an integer from 1-100 inclusive.

The silicone compositions can be used as coatings, contact lens, pressure adhesives, implants, etc. Other features, objects, and advantages of the invention will be apparent from the description and from the claims.

DETAILED DESCRIPTION

This disclosure relates to a synthetic method for preparing dual (e.g., thermal and light) curable silicone compositions, and dual curable silicone compositions.

Structure 1
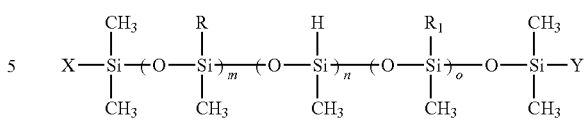

where R is $C_{1-4}$ alkyl group, e.g., methyl, ethyl, propyl, butyl group, or their isomers;

$R_1$ is a substituted group having acrylate, methacrylate, or di(propylene glycol) methacrylate group in the chain while a combined percentage of n and o does not exceed 50 with respect to a sum of in, n, and o; and X and Y are chain terminal groups (where X and Y can be either the same or different), which can be vinyl ($-CH=CH_2$), acrylate ($-OOCCH=CH_2$), methacrylate ($-OOC(CH_3)C=CH_2$), hydroxyl ($-OH$), hydride ($-H$), alkyl ($-R$), or alkoxyl ($-OR$). The alkyl group can be substituted with vinyl, acrylate, methacrylate, or hydroxyl.

Each polymer chain can include various functional groups, i.e., X and Y functional groups at the chain ends, silanichydride (Si—H) bonds, and acrylate-/methacrylate-groups along the chain, in various mole ratios.

As used herein, the term "alkyl," when used alone or together with additional moiety terms, refers to a straight-chained or branched, saturated hydrocarbon group having from 1 to 6 carbon atoms, 1 to 4 carbon atoms, or 1 to 3 carbon atoms. Example alkyl groups include methyl, ethyl, n-propyl, isopropyl, n-butyl, isobutyl, sec-butyl, and the like.

As used herein, the term "alkoxyl" refers to an —O-alkyl group. Example alkoxyl groups include methoxy, ethoxy, propoxy (e.g., n-propoxy and isopropoxy), t-butoxy, and the like.

Thermal curing of the silicone compositions can be performed by either of two methods—the first one, using heat with a suitable catalyst, e.g., platinum, to initiate an addition reaction between silanichydride (Si—H) bonds in the polymer chains and carbon-carbon double bonds at the polymer chain ends (in this case, X and Y are vinyl groups); and the second one, using heat with a suitable thermal free radical initiator, e.g., dicumyl peroxide (DCP), to initiate a free radical polymerization of acrylate or methacrylate groups in each polymer molecule.

The free radical polymerization of acrylate or methacrylate groups can also be initiated by using light with a suitable photoinitiator, e.g., camphorquinone, to cure the silicone compositions.

The synthetic method for dual curable (e.g., thermal and light curable) silicone compositions includes two steps.

Step One.

Acrylate-/methacrylate-functionalized monomer: This can be performed by hydrosilylation reaction at silanichydride bonds of hydride functionalized cyclic siloxane monomer (e.g., tetramethylcyclotetrasiloxane (D4H), hexamethylcyclotetrasiloxane, heptamethylcyclotetrasiloxane, pentamethylcyclopentasiloxane, or a combination thereof) with acrylate-/methacrylate-containing allylic monomer (e.g., allyl acrylate, allyl methacrylate, di(propylene glycol)allylether methacrylate, or a combination thereof) using a platinum catalyst. An excess of allylic monomer can be employed in the reaction with silanichydride bonds to ensure that the reaction occurred in every silanichydride bond. The unreacted allylic monomer can then be removed by high vacuum pumping at 60-70° C. The first product typically is acrylate-/methacrylate-modified cyclic siloxane monomer. When D4H is employed, the product is acrylate-/methacrylate-containing tetramethylcyclotetrasiloxane (D4MA), having chemical structure as shown in Structure 2.

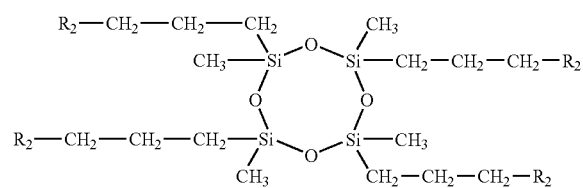

Structure 2 where $R_2$ is a substituted group having acrylate, methacrylate, or di(propylene glycol)methacrylate group.

Step Two.

A ring-opening polymerization of acrylate/methacrylate modified cyclic siloxane monomer (e.g., D4MA, obtained from the step one when D4H is used) can be performed with a siloxane such as linear polysiloxane, $C_{1-4}$ alkyl substituted cyclic siloxane monomer (e.g., octamethylcyclotetrasiloxane (D4), 2,4,6-triethyl-2,4,6-trimethylcyclotrisiloxane or combinations thereof) or hydride functionalized cyclic siloxane polymer (e.g., tetramethylcyclotetrasiloxane (D4H), hexamethylcyclotetrasiloxane, heptamethylcyclotetrasiloxane, pentamethylcyclopentasiloxane; or combinations thereof) using a chain terminator such as oligosiloxanes (e.g., siloxane dimer, siloxane trimer, siloxane tetramer, or siloxane pentamer) having various functional groups at both oligomer chain ends. A general chemical structure of the oligosiloxane chain terminator is presented in Structure 3.

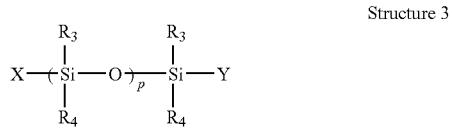

Structure 3 where $R_3$ and $R_4$ are substituted $C_{1-4}$ alkyl groups, which can be either the same or different; X and Y are the same functional groups as described in Structure 1 (where X and Y can be either the same or different); and p is a positive integer, not greater than 5 such as 1, 2, 3, 4, or 5.

Examples of chain terminators (for controlling molecular weights of synthesized silicone compositions) are 1,3-divinyltetramethyldisiloxane, 1,3-bis(4-methacryloyloxybutyl)-1,1,3,3-tetramethyldisiloxane, 1,3-bis(3-methacryloyloxypropyl)-1,1,3,3-tetramethyldisiloxane, 1,3-dihydroxy-1,1,3,3-tetramethyldisiloxane, 1,1,3,3-tetramethyldisiloxane, hexamethyldisiloxane, pentamethyldisiloxane, 1,3-diethoxy-1,1,3,3-tetramethyldisiloxane, octamethyltrisiloxane, and 1,1,3,3,5,5,7,7-octamethyltetrasiloxane.

The reaction is performed under acidic condition where the molecular weight of synthesized silicones is controlled by the amount of chain terminator used in the reaction. In general, the molecular weight of synthesized silicone is 1,000-1,000,000 g/mol; and the ratio of presented silanichydride group to acrylate/methacrylate group can be controlled by the amounts of hydride functionalized cyclic siloxane and acrylate/methacrylate functionalized cyclic siloxane. The percentage of combined moles (mol %) of two functional groups should generally not exceed 50% of combined moles of silicon-hydrogen, acrylate/methacrylate, and alkyl siloxane in the silicone composition. Certain implementations are further described in the following examples, which are not intended to limit the scope of the disclosure.

Example 1

Preparation of Methacrylate Functionalized Cyclic Siloxane Monomer 12.13 mL ($9.02 \times 10^{-2}$ mol) allyl methacrylate (from Aldrich), 2 g ($1.82 \times 10^{-2}$ mol) hydroquinone (from Fluka), 0.058 mL platinum(0)-1,3-divinyl-1,1,3,3-tetramethyldisiloxane complex solution in xylene, Pt ~3 wt % (from Aldrich), and 20 mL toluene were added in a round bottom flask and stirred at room temperature under nitrogen atmosphere for 10 minutes. Next, 5 mL ($2.05 \times 10^{-2}$ mol) tetramethylcyclotetrasiloxane (D4H, from Fluka) was gradually added dropwise to the solution. The solution was heated to 70° C. and continuously stirred for 24 hours. After the reaction had been completed, the solution was filtered through silica gel, rinsed with a mixed solvent of hexane and ethyl acetate (98:2, by volume). The solvent was evaporated, and the remaining allyl methacrylate was removed by vacuum pump at 70° C. over a period of 6 hours. The obtained product was D4MA, which was clear. From $^1$H-NMR technique, a proton signal of silanichydride of D4H was not detected at position of 4.7 ppm, indicating the completion of hydrosilylation reaction of D4H.

Example 2

Synthesis of Vinyl Terminated Silicone Compositions

The dual curable silicone having vinyl terminated functional groups on both ends, i.e., poly(methylhydride-ter-propylmethacrylate-ter-dimethyl)siloxane, divinyl terminated (PMPDS-divinyl terminated), was prepared by ring-opening polymerization of 5 mL ($1.61 \times 10^{-2}$ mol) octamethylcyclotetrasiloxane (D4), 0.665 g ($8.94 \times 10^{-4}$ mol) D4MA, and 0.218 mL ($8.94 \times 10^{-4}$ mol) D4H with 37.10 μl ($1.61 \times 10^{-4}$ mol) 1,3-divinyltetramethyldisiloxane (D2V) as chain terminator and molecular weight controller. This was performed by mixing all substances in a rounded-bottom flask, adding the triflic acid catalyst, and stirring the solution at room temperature under nitrogen atmosphere for 30 minutes. The temperature was increased to 55° C., and the solution was stirred continuously for 24 hours. The solution was adjusted to neutral pH using sodium bicarbonate and stirred for a further 2 hours. The unreacted substances were removed by vacuum pumping at 60° C. over a period of 6 hours. The final silicone product was clear and viscous.

Example 3

Synthesis of Hydroxypropyl Terminated Silicone Compositions

The dual curable silicone having hydroxypropyl terminated functional groups on both ends, i.e., poly(methylhydride-ter-propylmethacrylate-ter-dimethyl)siloxane, dihydroxypropyl terminated (PMPDS-dihydroxypropyl terminated), was prepared by ring-opening polymerization of 5 mL ($1.61 \times 10^{-2}$ mol) octamethylcyclotetrasiloxane (D4, from Aldrich), 0.665 g ($8.94 \times 10^{-4}$ mol) D4MA from Example 1, and 0.218 mL ($8.94 \times 10^{-4}$ mol) D4H with 42.32 μl ($1.61 \times 10^{-4}$ mol) 1,3-bis(3-hydroxypropyl)tetramethyldisiloxane (D2OH, from Gelest) as chain terminator and molecular weight controller. This was performed by mixing all substances in a rounded-bottom flask, adding the triflic acid catalyst, and stirring the solution at room temperature under nitrogen atmosphere for 30 minutes. The temperature was increased to 55° C., and the solution was stirred continuously for 24 hours. The solution was adjusted to neutral pH using sodium bicarbonate and stirred for a further 2 hours. The solution was then filtered, and unreacted substrates were removed by vacuum pumping at 60° C. over a period of 6 hours. The final silicone product was clear and viscous. $^1$H-NMR technique was employed to examine the proton signals of silicon-hydrogen, methacrylate, and hydroxypropyl groups, at both polymer chain ends.

Example 4

Synthesis of Hydride Terminated Silicone Compositions

The dual curable silicone having hydride terminated functional groups on both ends, i.e., poly(propylmethacrylate-co-dimethyl)siloxane, dihydride terminated (PPDS-dihydride terminated), was prepared by ring-opening polymerization of 5 mL ($1.61 \times 10^{-2}$ mol) octamethylcyclotetrasiloxane (D4), 0.631 g ($8.74 \times 10^{-4}$ mol) D4MA from Example 1 with 28.45 µl ($1.61 \times 10^{-4}$ mol) 1,1,3,3-tetramethyldisiloxane (D2H, from Aldrich) as chain terminator and molecular weight controller. This was performed by mixing all substances in a rounded-bottom flask, adding the triflic acid catalyst, and stirring the solution at room temperature under nitrogen atmosphere for 30 minutes; The temperature was increased to 55° C., and the solution was stirred continuously for 24 hours. The solution was adjusted to neutral pH using sodium bicarbonate and stirred for a further 2 hours. The solution was then filtered. The unreacted substances were removed by vacuum pumping at 60° C. for over a period of 6 hours. The final silicone product was clear and viscous. $^1$H-NMR technique was employed to examine proton signals of methacrylate and silanichydride groups at both polymer chain ends.

Example 5

Synthesis of Acryloyloxypropyl Terminated Silicone Compositions

The dual curable silicone having acryloyloxypropyl terminated functional groups on both ends, i.e., poly(methylhydride-ter-propylmethacrylate-ter-dimethyl)siloxane, diacryloyloxypropyl terminated (PMPDS-diacryloyloxypropyl terminated), was prepared by ring-opening polymerization of 5 mL ($1.61 \times 10^{-2}$ mol) octamethylcyclotetrasiloxane (D4), 0.665 g ($8.94 \times 10^{-4}$ mol) D4MA, and 0.218 mL ($8.94 \times 10^{-4}$ mol) D4H with 57.73 µl ($1.61 \times 10^{-4}$ mol) 1,3-bis(3-acryloyloxypropyl)-1,1,3,3-tetramethyldisiloxane (D2A) as chain terminator and molecular weight controller. This was performed by mixing all substances in a rounded-bottom flask using 2 mL tetrahydrofuran (THF) as solvent, adding the triflic acid catalyst, and stirring the solution at room temperature under nitrogen atmosphere for 30 minutes. The temperature was increased to 55° C. and stirred continuously for 24 hours. The solution was adjusted to neutral pH using sodium bicarbonate and stirred for further 2 hours. The solution was then filtered. The unreacted substances were removed by vacuum pumping at 60° C. over a period of 6 hours. The final silicone product was clear and viscous. $^1$H-NMR technique was employed to examine proton signals of silanichydride, methacrylate, and acrylate groups at both polymer chain ends.

Example 6

Light Curing of Silicone Composition 0.20 g of silicone obtained from Example 2 was mixed with 0.002 g photoinitiator, i.e. camphorquinone (CQ) (from ESSTECH, Inc., Essington, USA; 1% wt of obtained silicone from Example 2). The mixture was poured into a clear-plastic mold; the sample was irradiated by blue light with 420-550 nm wavelengths for 30 minutes. The curing efficiency of the obtained silicone from Example 2 was determined after extracting the crosslinked product with a solvent that dissolved the silicone obtained from Example 2 (e.g., hexane). The percentage by weight of the crosslinked silicone was about 80.

Example 7

Light Curing of Silicone Composition 0.20 g of PPDS-dihydride terminated, obtained from Example 4, was mixed with 0.002 g photoinitiator, i.e. camphorquinone (CQ) (from ESSTECH, Inc., Essington, USA; 1% wt of PPDS-dihydride terminated). The mixture was poured into a clear-plastic mold; the sample was irradiated by blue light with 420-550 nm wavelengths for 30 minutes. The curing efficiency of PPDS-dihydride terminated was determined after extracting the crosslinked product with a solvent that dissolved PPDS-dihydride terminated (e.g., hexane). The percentage by weight of the crosslinked PPDS-dihydride terminated was about 84.

Example 8

Thermal Curing of Silicone Composition 0.20 g of silicone obtained from Example 2 was mixed with 0.68 µl (120 ppm platinum in silicone) platinum(0)-1,3-divinyl-1,1,3,3-tetramethyldisiloxane complex solution in xylene, Pt ~3 wt % (from Aldrich). The mixture was poured into a Teflon mold; the sample was heated at 120° C. for 30 minutes. The curing efficiency of the obtained silicone from Example 2 was determined after extracting the crosslinked product with a solvent that dissolved the silicone obtained from Example 2 (e.g., hexane). The percentage by weight of the crosslinked silicone was about 58.

Example 9

Thermal Curing of Silicone Composition 0.20 g of silicone obtained from Example 2 was mixed with 0.002 g thermal initiator, i.e. dicumyl peroxide (DCP, from Fluka; 1% wt of obtained silicone from Example 2). The mixture was poured into a Teflon mold; the sample was heated at 160° C. for 60 minutes. The curing efficiency of the obtained silicone from Example 2 was determined after extracting the crosslinked product with a solvent that dissolved the silicone obtained from Example 2 (e.g., hexane). The percentage by weight of the crosslinked silicone was about 90.

Example 10

Thermal Curing of Silicone Composition 0.20 g of PPDS-dihydride terminated, obtained from Example 4, was mixed with 0.68 µl (120 ppm platinum in silicone) platinum(0)-1,3-divinyl-1,1,3,3-tetramethyldisiloxane complex solution in xylene, Pt ~3 wt %. The mixture was poured into a Teflon mold; the sample was heated at 120° C. for 30 minutes. The curing efficiency of PPDS-dihydride terminated was determined after extracting the crosslinked product with a solvent that dissolved PPDS-dihydride terminated (e.g., hexane). The percentage by weight of the crosslinked PPDS-dihydride terminated was about 62.

Example 11

Thermal Curing of Silicone Composition 0.20 g of PPDS-dihydride terminated, obtained from Example 4, was mixed with 0.002 g thermal initiator, i.e., dicumyl peroxide (DCP, from Fluka; 1% wt of PPDS-dihydride terminated). The mixture was poured into a Teflon mold; the sample heated at 160° C. for 60 minutes. The curing efficiency of PPDS-dihydride terminated was determined after extracting the crosslinked product with a solvent that dissolved PPDS-dihydride terminated (e.g., hexane). The percentage by weight of the crosslinked PPDS-dihydride terminated was about 87.

Example 12

Thermal and Light Curing of Silicone Composition 0.20 g of silicone obtained from Example 2 was mixed with 0.001 g camphorquinone (0.5% wt of obtained silicone from Example 2) and 0.68 μl (i.e. 120 ppm platinum in silicone) platinum(0)-1,3-divinyl-1,1,3,3-tetramethyldisiloxane complex solution in xylene, Pt ~3 wt %. The mixture was poured into a clear-plastic mold; the sample was irradiated by blue light with 420-550 nm wavelengths for 30 minutes. The sample was then placed in an oven and heated at 120° C. for 30 minutes. The curing efficiency of the obtained silicone from Example 2 was determined after extracting the crosslinked product with a solvent that dissolved the silicone obtained from Example 2 (e.g., hexane). The percentage by weight of the crosslinked silicone was about 94.

Example 13

Thermal and Light Curing of Silicone Composition 0.20 g of PPDS-dihydride terminated, obtained from Example 4, was mixed with 0.001 g camphorquinone (0.5% wt of PPDS-dihydride terminated) and 0.68 μl (120 ppm platinum in silicone) platinum(0)-1,3-divinyl-1,1,3,3-tetramethyldisiloxane complex solution in xylene, Pt ~3 wt %. The mixture was poured into a clear-plastic mold; the sample was irradiated by blue light with 420-550 nm wavelengths for 30 minutes. The sample was then placed in an oven and heated at 120° C. for 30 minutes. The curing efficiency of PPDS-dihydride terminated was determined after extracting the crosslinked product with a solvent that dissolved PPDS-dihydride terminated (e.g., hexane). The percentage by weight of the crosslinked PPDS-dihydride terminated was about 84.

What is claimed is:

1. A synthetic method for preparing a dual curable silicone composition, the method comprising:
    a hydrosilylation reaction of hydride functionalized cyclic siloxane monomer with acrylate-/methacrylate-containing allylic monomer, giving an acrylate-/methacrylate-functionalized cyclic siloxane monomer; and
    a ring-opening polymerization of the acrylate-/methacrylate-functionalized cyclic siloxane monomer with a linear polysiloxane, an optional $C_{1-4}$ alkyl substituted cyclic siloxane monomer, an optional hydride functionalized cyclic siloxane monomer, and an oligosiloxane as a chain terminator, the oligosiloxane having the same or different functional groups at both chain ends.

2. The method of claim 1, wherein the hydride functionalized cyclic siloxane monomer is selected from the group consisting of tetramethylcyclotetrasiloxane, hexamethylcyclotetrasiloxane, heptamethylcyclotetrasiloxane, pentamethylcyclopentasiloxane, and combinations thereof.

3. The method of claim 1, wherein the acrylate-/methacrylate-containing allylic monomer is selected from the group consisting of allyl acrylate, allyl methacrylate, di(propylene glycol)allylether methacrylate, and combinations thereof.

4. The method of claim 1, wherein the $C_{1-4}$ alkyl substituted cyclic siloxane monomer is selected from the group consisting of octamethylcyclotetrasiloxane, 2,4,6-triethyl-2,4,6-trimethylcyclotrisiloxane, and combinations thereof.

5. The method of claim 1, wherein the functional groups of the oligosiloxane are independently selected from the group consisting of vinyl ($CH_2$=CH—), acrylate (—OOCCH=$CH_2$), methacrylate (—OOC($CH_3$)C=$CH_2$), hydroxyl (—OH), hydride (—H), alkyl (—R), and alkoxyl (—OR), wherein said alkyl is optionally substituted with vinyl, acrylate, methacrylate, or hydroxyl.

6. The method of claim 1, wherein the oligosiloxane is selected from the group consisting of siloxane dimer, siloxane trimer, siloxane tetramer, siloxane pentamer, and siloxane hexamer.

7. The method of claim 6, wherein the siloxane dimer is selected from the group consisting of 1,3-divinyltetramethyldisiloxane, 1,3-bis(4-methacryloyloxybutyl)-1,1,3,3-tetramethyldisiloxane, 1,3-bis(3-methacryloyloxypropyl)-1,1,3,3-tetramethyldisiloxane, 1,3-dihydroxy-1,1,3,3-tetramethyldisiloxane, 1,1,3,3-tetramethyldisiloxane, hexamethyldisiloxane, pentamethyldisiloxane, and 1,3-diethoxy-1,1,3,3-tetramethyldisiloxane.

8. The method of claim 6, wherein the siloxane trimer is octamethyltrisiloxane.

9. The method of claim 6, wherein the siloxane tetramer is 1,1,3,3,5,5,7,7-octamethyltetrasiloxane.

10. The method of claim 1, wherein the acrylate-/methacrylate-functionalized cyclic siloxane monomer is acrylate-/methacrylate-containing tetramethylcyclotetrasiloxane of Structure 2:

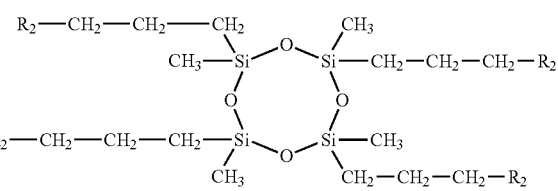

Structure 2 wherein $R_2$ is a substituted group having acrylate, methacrylate, or di(propylene glycol) methacrylate group.

11. The method of claim 1, wherein the silicone composition comprises a silicone of Structure 1:

Structure 1

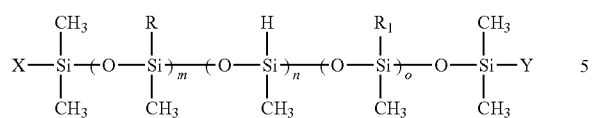

wherein R, at each occurrence, is $C_{1-4}$ alkyl group; $R_1$, at each occurrence, is a substituted group having an acrylate or methacrylate group; X and Y are independently selected from the group consisting of vinyl, acrylate, methacrylate, hydroxyl, hydride, alkyl, and alkoxyl, wherein said alkyl is optionally substituted with vinyl, acrylate, methacrylate, or hydroxyl; and m, n, and o are independently an integer from 1-100 inclusive.

12. The method of claim 11, wherein R, at each occurrence, is methyl or ethyl; $R_1$, at each occurrence, is a propyl group comprising an acrylate or methacrylate group; X and Y are independently selected from the group consisting of vinyl, hydroxyl, hydride, and alkyl, wherein said alkyl is optionally substituted with acrylate, methacrylate, or hydroxyl; and m, n, and o are independently an integer from 1-100 inclusive.

13. The method of claim 11, wherein the combined percentage of n and o with respect to m, n, and o is less than about 50%.

14. The method of claim 11, wherein the silicone composition is curable by heat and light.

* * * * *